United States Patent Office 3,345,407
Patented Oct. 3, 1967

3,345,407
CATALYSTS FOR THE PREPARATION OF BIS-(2,6-DIETHYLPHENYL)CARBODIIMIDE
Benjamin W. Tucker, West Haven, and Henri Ulrich, Northford, Conn., assignors to The Upjohn Company, Kalamazoo, Mich., a corporation of Delaware
No Drawing. Filed Mar. 5, 1965, Ser. No. 437,597
4 Claims. (Cl. 260—551)

This invention relates to an improved process for the preparation of certain carbodiimides and is more particularly concerned with an improved process for the preparation of bis(2,6 - disubstitutedphenyl)carbodiimides.

The novel process of the invention comprises a process for the preparation of bis(2,6 - diethylphenyl)carbodiimide which process comprises heating 2,6-diethylphenyl isocyanate with a catalyst selected from the class consisting of alkali metal tertiary alkoxides and alkali metal 2,6-di(tert-alkyl)phenoxides. The term "alkali metal alkoxides" is inclusive of the sodium, potassium and lithium derivatives of tertiary aliphatic alcohols having the formula

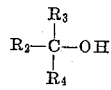

wherein $R_2$, $R_3$ and $R_4$ each represent lower alkyl i.e. alkyl containing from 1 to 6 carbon atoms, inclusive, such as methyl, ethyl, propyl, butyl, pentyl, hexyl, and isomeric forms thereof. Examples of such tertiary aliphatic alcohols are tert-butyl alcohol, tertiary amyl alcohol, 2 -methylbutan - 2 - ol, 3-methylhexan-3-ol, 3-ethylhexan - 3 - ol - 2 - methylhexan-2-ol, 2,3-dimethylhexan-2-ol, 3-methylheptan-3-ol, 2-methylheptan-2-ol, 4-ethylnonan-4-ol, 5-methylundecan-5-ol, and the like.

The term "alkali metal 2,6-di(tert-alkyl)phenoxides" means the alkali metal salts of 2,6-di(tert-alkyl)phenols having the formula

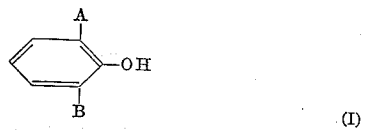

wherein A and B each represent a tertiary alkyl group, preferably a tertiary alkyl group containing from 4 to 10 carbon atoms, inclusive, such as tert-butyl, tert-amyl, 2-methyl-2-butyl, 3-methyl-3-hexy, 3-ethyl-3-hexyl, 2-methyl-2-hexyl, 3-propyl-3-heptyl, 4-ethyl-4-octyl, and the like. The benzene nucleus of (I) can be additionally substituted in one or more of the 3-, 4-, and 5-positions by substituents which are inert under the conditions of the reaction such as alkyl, for example, methyl, ethyl, propyl, butyl, pentyl, hexyl, and isomeric forms thereof; alkoxy such as methoxy, ethoxy, propoxy, butoxy, pentyloxy, hexyloxy, and isometric forms thereof; and halo i.e. fluoro, chloro, bromo, and iodo.

The catalytic conversion of isocyanates to carbodiimides is well-known in the art. The use of various organo-phosphorus catalysts as described, for example, in U.S. Patents 2,840,589 and 3,056,835, generally achieves the conversion in good overall yields with a minimum of side products, particularly polymers derived from the isocyanate. The use of such catalysts contributes significantly to the cost of production of the carbodiimides and it is desirable to use catalysts which are more readily available and which are less expensive to make and use. It has recently been shown by Neumann et al., French Patent 1,293,252, German Patent 1,156,401 and British Patent 930,036, that, in the case of phenyl isocyanates having at least one substituent in the ortho position, it is possible to obtain the corresponding carbodiimide in good yield using catalysts which normally give excessive amounts of undesirable polymerisation products when used with isocyanates which do not carry ortho substituents. For example, Neumann et al. state that phenyl isocyanates having an alkyl group containing 2 or more carbon atoms in at least one positon ortho to the isocyanate group, can be converted in good yield to the corresponding carbodiimides using catalysts such as alkali metal alkoxides and sodium phenolate which are known to give excessive amounts of isocyanuric acid derivatives when used with phenylisocyanates which are not so substituted in the ortho positions.

We have found, however, that the application of the Neumann process to the conversion of 2,6-diethylphenyl isocyanate to bis(2,6-diethylphenyl)carbodiimide gives a product containing substantial amounts of tris(2,6-diethylphenyl)isocyanurate. For example, the conversion of 2,6-diethylphenyl isocyante using sodium methoxide or sodium phenolate (representative of the Neumann et al. catalysts) gives bis(2,6-diethylphenyl)carbodiimide in only 42% yield accompanied by 23 to 27% yield of tris(2,6-diethylphenyl)isocyanurate.

We have now found surprisingly and unexpectedly, that using certain groups of catalysts, namely the alkali metal salts of tertiary aliphatic alcohols or of 2,6-di(tert-alkyl) phenols, it is possible to convert 2,6-diethylphenyliso-cyanate to bis(2,6-diethylphenyl)carbodiimide in high yield and without the formation of significant amounts of by-products such as tris(2,6-diethylphenyl)isocyanurate. The use of this particular group of catalysts is not suggested by the prior art and the finding that this group of catalysts gives such excellent results is both novel and unexpected.

Bis - (2,6-diethylphenyl)carbodiimide is a compound which has found use as a stabilizer to prevent ageing and hydrolysis of elastomers and is of particular use in the stabilisation of polyurethane elastomers. It is an especially desirable product for such uses since it is a liquid at normal temperatures (of the order of 25° C.) and can be readily incorporated into elastomers during the preparation of same.

In carrying out the process of the invention a mixture of 2,6-diethylphenylisocyanate and the catalyst is heated at a temperature above about 150° C. and below the decomposition temperature of the reactants and the product of reaction. Preferably the upper limit of reaction temperature is of the order of 300° C. but temperatures above this can be employed depending upon the particular catalyst employed. Advantageously the catalyst is employed in an amount from about 0.01 percent to about 5 percent by weight of isocyanate and is preferably employed in an amount from about 0.1 to about 1 percent by weight of isocyanate.

The heating of the reaction mixture is continued until conversion to carbodiimide is complete as indicated by conventional tests, for example, cessation of carbon dioxide evolution, disappearance of IR bands indicative of isocyanate groups, etc.

When the reaction is complete the reaction mixture is cooled to room temperature. The product so obtained is suitable, without further purification, for many uses as a stabilizer as discussed above. However, the reaction product can be purified by conventional procedures, if desired. For example the bis(2,6-diethylphenyl)carbodiimide can be recovered by distillation in high yield. Preliminary aqueous washing of the reaction product can be carried out to remove unchanged catalyst if desired.

The following examples describe the manner and process of making and using the invention set forth the best mode contemplated by the inventors of carrying out the invention but are not to be construed as limiting.

Example 1

A mixture of 612.5 g. (3.5 moles) of 2,6-diethylphenyl isocyanate and 0.61 g. (0.1% by weight) of potassium tert.-butoxide was heated for 90 minutes at a temperature of 200 to 250° C. At the end of this time the product was subjected to distillation under reduced pressure to obtain 492.3 g. (90.1% yield) of bis(2,6-diethylphenyl)carbodiimide having a boiling point of 194 to 197° C. at a pressure of 0.5 mm. of mercury; $n_D^{23.5}$ 1.5912.

For purposes of comparison the above example was repeated using a mixture of 17.5 grams (0.1 mole) of 2,6-diethylphenyl isocyanate and 0.175 g. (1% by weight) of sodium methylate in place of the potassium tert.-butoxide. The reaction mixture was heated at 190 to 198° C. for 10.7 hr. and then cooled and treated with 50 ml. of diethyl ether. The solid which separated was isolated by filtration to give 4.8 g. (27.4% theoretical) of tris(2,6-diethylphenyl) isocyanurate having a melting point of 300 to 306° C. The filtrate from the above treatment was evaporated to dryness and the residue was distilled under reduced pressure to obtain 6.3 g. (41.2% yield) of bis(2,6-diethylphenyl)carbodiimide having a boiling point of 140 to 148° C. at a pressure of 0.07 mm. of mercury.

Example 2

A mixture of 17.5 g. (0.1 mole) of 2,6-diethylphenyl isocyanate and 0.175 g. (1% by weight) of potassium tert-butoxide was heated for 3 hours at 190 to 192° C. At the end of this time the reaction product was distilled under reduced pressure to yield 12.3 g. (80.4% yield) of bis(2,6 - diethylphenyl)carbodiimide having a boiling point of 145 to 148° C. at a pressure of 0.07 mm. of mercury.

Example 3

A mixture of 17.5 g. (0.1 mole) of 2,6-diethylphenyl isocyanate and 0.175 g. (1% by weight) of lithium tert.-butoxide was heated at 190 to 198° C. for 9 hours. At the end of this time the reaction product was subjected to distillation under reduced pressure to yield 10.9 g. (71.3% yield) of bis(2,6 - diethylphenyl)carbodiimide having a boiling point of 146 to 148° C. at a pressure of 0.07 mm. of mercury.

Example 4

A mixture of 17.5 g. (0.1 mole) of 2,6-diethylphenyl isocyanate and 0.175 g. (1.0% by weight) of sodium 2,6-di(tert. - butyl)-4-methylphenolate was heated for 18 hours at 190 to 195° C. The product so obtained was subjected to distillation under reduced pressure to obtain 10.55 g. (69% yield) of bis(2,6-diethylphenyl)carbodiimide having a boiling point of 146 to 149° C. at a pressure of 0.07 mm. of mercury.

For purposes of comparison the above procedure was repeated using 0.175 g. (1% by weight) of sodium phenolate in place of the sodium 2,6-di(tert.-butyl)-4-methylphenolate. After the reaction mixture had been heated for 11 hours at 190 to 200° C. an additional amount of 0.175 g. of sodium phenolate was added and the heating was continued for a total of 17.3 hours. The reaction mixture was cooled and treated with 50 ml. of diethyl ether. The solid which separated was isolated by filtration to give 4.05 g. (23.1% theoretical) of tris(2,6-diethylphenyl)isocyanurate having a melting point of 300 to 306° C. The filtrate from the above treatment was evaporated to dryness and the residue was distilled under reduced pressure to give 6.5 g. (42.4% yield) of bis(2,6-diethylphenyl)carbodiimide having a boiling point of 145 to 149° C. at 0.07 mm. of mercury.

Example 5

Using the procedure described in Example 1, but replacing potassium tert.-butoxide by potassium tert.-amylate, there is obtained bis(2,6-diethylphenyl)carbodiimide in comparable yield.

Similarly, using the procedure described in Example 1, but replacing potassium tert-butoxide by other alkali metal tert-alkoxides such as the sodium salt of 2-methylbutan-2-ol, the potassium salt of 3-methylhexan-3-ol, the sodium salt of 3-ethylhexan-3-ol, the sodium salt of 2,3-dimethylhexan-2-ol, and the like, or by alkali metal 2,6-di(tert-alkyl)phenolates such as sodium 2,6-di(tert-butyl)phenolate, potassium 2,6 - di(tert - amyl)-4-tert-butylphenolate, sodium 2,6-di(tert-butyl)-4-ethylphenolate, and the like, there is obtained bis(2,6-diethylphenyl)carbodiimide in comparable yield.

We claim:
1. In a process for the preparation of bis(2,6-diethylphenyl)carbodiimide by heating 2,6-diethylphenyl isocyanate above about 150° C. and below the decomposition temperature of the reaction mixture in the presence of a catalyst the improvement which consists of employing as catalyst a member selected from the class consisting of (a) an alkali metal derivative of a tertiary aliphatic alcohol having the formula:

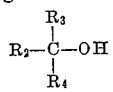

wherein $R_2$, $R_3$, and $R_4$ each represent lower-alkyl and (b) an alkali metal derivative of a 2,6-(tert.-alkyl)phenol having the formula:

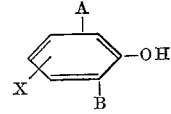

wherein A and B each represent tertiary-alkyl of from 4 to 10 carbon atoms, inclusive, and X is selected from the class consisting of hydrogen, lower-alkyl, lower-alkoxy, and halo.

2. In a process for the preparation of bis(2,6-diethylphenyl)carbodiimide by heating 2,6-diethylphenylisocyanate at above about 150° C. and below the decomposition temperature of the reaction mixture in the presence of a catalyst the improvement which consists of employing potassium tert.-butoxide as catalyst.

3. In a process for the preparation of bis(2,6-diethylphenyl)carbodiimide by heating 2,6-diethylphenylisocyanate at above about 150° C. and below the decomposition temperature of the reaction mixture in the presence of a catalyst the improvement which consists of employing lithium tert.-butoxide as catalyst.

4. In a process for the preparation of bis(2,6-diethylphenyl)carbodiimide by heating 2,6-diethylphenylisocyanate at above about 150 °C. and below the decomposition temperature of the reaction mixture in the presence of a catalyst the improvement which consists of employing sodium 2,6-di(tert.-butyl)-4-methylphenolate as catalyst.

References Cited

FOREIGN PATENTS 930,036 7/1963 England.

WALTER A. MODANCE Primary Examiner.

H. I. MOATZ, Assistant Examiner.